United States Patent [19]

Kagami et al.

[11] Patent Number: 5,648,423

[45] Date of Patent: Jul. 15, 1997

[54] POLYAMIDE RESIN COMPOSITION

[75] Inventors: Mamoru Kagami; Mutsuhiro Tanaka; Masahiro Sugi, all of Ichihara, Japan

[73] Assignee: Mitsui Petrochemical Industries, Ltd., Tokyo, Japan

[21] Appl. No.: 411,597

[22] PCT Filed: Aug. 4, 1994

[86] PCT No.: PCT/JP94/01296

§ 371 Date: Apr. 5, 1995

§ 102(e) Date: Apr. 5, 1995

[87] PCT Pub. No.: WO95/04781

PCT Pub. Date: Feb. 16, 1995

[30] Foreign Application Priority Data

Aug. 5, 1993 [JP] Japan ................. 5-194805

[51] Int. Cl.$^6$ ........................... C08L 77/00
[52] U.S. Cl. ........................... 525/66; 525/183
[58] Field of Search ........................... 525/66

[56] References Cited

U.S. PATENT DOCUMENTS

| | | | |
|---|---|---|---|
| 4,174,358 | 11/1979 | Epstein | 525/183 |
| 4,346,194 | 8/1982 | Roura | 525/66 |
| 4,410,653 | 10/1983 | Kohan | 524/371 |
| 4,478,978 | 10/1984 | Roura | 525/66 |

FOREIGN PATENT DOCUMENTS

| | | |
|---|---|---|
| 53-80011 | 7/1978 | Japan . |
| 55-9661 | 1/1980 | Japan . |
| 55-9662 | 1/1980 | Japan . |
| 56-167751 | 12/1981 | Japan . |
| 62-43456 | 2/1987 | Japan . |
| 63-057668 | 3/1988 | Japan . |
| 4261464 | 9/1992 | Japan . |
| 9300404 | 1/1993 | WIPO . |

OTHER PUBLICATIONS

Macromolecules 1982, vol. 15, pp. 353–360, Ethylene–1–Butene Copolymers Comonomer Sequence Distribution by Eric T. Hsieh et al.

Polymer, 1984, vol. 25, Apr. pp. 441–446, Carbon–13 Nuclear Magnetic Resonance Study of Ethylene–1–octene and Ethylene–4–. . . by K. Kimura et al.

Ethylene–Propylene Copolymers pp. 773–778 vol. 10, No. 4, Jul./Aug. 1977 Carbon–13 Nuclear Magnetic Resonance Determination . . . by G. Joseph Ray et al.

*Primary Examiner*—Ana Woodward
*Attorney, Agent, or Firm*—Sherman and Shalloway

[57] ABSTRACT

The polyamide resin composition of the present invention comprises 100 parts by weight of a polyamide resin and 5 to 200 parts by weight of a graft-modified ethylene/1-butene random copolymer having a graft quantity of an unsaturated carboxylic acid or its derivative of 0.01 to 10% by weight. The graft-modified ethylene/1-butene random copolymer is a graft-modified product of an ethylene/1-butene random copolymer having a 1-butene content of 15 to 25% by mol, an intrinsic viscosity [η] of 0.5 to 3.5 dl/g, a glass transition temperature (Tg) of not higher than −60° C., a crystallinity of less than 10%, and a parameter (B value) indicating randomness of a copolymerized monomer chain distribution, as measured by a $^{13}$C-NMR method, of 1.0 to 1.4. The polyamide resin composition shows high melt flowability, namely, good moldability, and it can provide a molded article excellent in flexibility, low-temperature impact resistance, resistance to water absorption and resistance to saline solutions.

10 Claims, No Drawings

POLYAMIDE RESIN COMPOSITION

This application is the Section 0 371 national phase application of International Application PCT/JP94/01296 filed Aug. 4, 1994.

TECHNICAL FIELD

The present invention relates to a polyamide resin composition, and more particularly to a polyamide resin composition which shows good moldability and can provide a molded article excellent in flexibility, low-temperature impact resistance, resistance to water-absorption and resistance to saline solutions.

BACKGROUND ART

Because of their excellent properties, a great demand for polyamide resins as engineering plastics is expected. However, the polyamide resins are not sufficient in flexibility, low-temperature impact resistance, resistance to water absorption and resistance to saline solutions, and improvements of these properties have been variously studied. If the polyamide resins are improved in the flexibility and the low-temperature impact resistance, there is expected wide use application of sporting goods such as ski shoes, sports shoes and industrial parts such as automobile parts, oil tubes, flexible tubes and air hoses, and a demand for such resins becomes great.

For improving the flexibility, the water resistance such as resistance to water absorption or the resistance to saline solutions of the polyamide resins, a method of adding an ethylene/$\alpha,\beta$-unsaturated monocarboxylic acid copolymer neutralized product (ionomer resin) to a polyamide resin is proposed in Japanese Patent Laid-Open Publications No. 80014/1978, No. 167751/1981, No. 109247/1981 and No. 157451/1981.

However, the polyamide resin compositions proposed in these publications are poor in the improvement of impact resistance such as Izod impact strength, particularly impact resistance at low temperatures, though they can be improved in the water resistance such as resistance to water absorption and resistance to saline solutions.

For improving the impact resistance such as Izod impact resistance of the polyamide resins, a method of adding an ethylene/$\alpha$-olefin copolymer grafted with an $\alpha,\beta$-unsaturated carboxylic acid to a polyamide resin is proposed in, for example, Japanese Patent Publications No. 12546/1967 and No. 44108/1980 and Japanese Patent Laid-Open Publication No. 9662/1980.

However, the polyamide resin compositions proposed in these publications are insufficient in the flexibility and the impact resistance at low temperatures. Moreover, these polyamide resin compositions are deteriorated in the moldability at same molding processes.

For improving particularly the flexibility of the polyamide resins, a method of adding an ethylene/propylene copolymer or an ethylene/1-butene copolymer grafted with an $\alpha,\beta$-unsaturated carboxylic acid to a polyamide resin in an amount of more than ⅔ times and not more than 6 times as much as the amount of the used polyamide resin is proposed in, for example, Japanese Patent Publication No. 13379/1987.

However, the polyamide resin composition proposed in this publication is still insufficient in the impact resistance at low temperatures and has a serious problem of deteriorated moldability, though it shows sufficient flexibility.

Under the circumstances, the advent of a polyamide resin composition which shows good moldability and can provide a molded article excellent in flexibility, low-temperature impact resistance, resistance to water absorption and resistance to saline solutions has been heretofore desired.

The present invention is intended to solve such problems associated with the prior art technique as mentioned above, and an object of the invention is to provide a polyamide resin composition which shows good moldability and can give a molded article excellent in flexibility, low-temperature impact resistance, resistance to water absorption and resistance to saline solutions.

DISCLOSURE OF THE INVENTION

The polyamide resin composition of the invention is characterized in that the composition comprises:

(A) a polyamide resin in an amount of 100 parts by weight, and (B) a graft-modified ethylene/1-butene random copolymer having a graft quantity of an unsaturated carboxylic acid or its derivative of 0.01 to 10% by weight, in an amount of 5 to 200 parts by weight, said graft-modified ethylene/1-butene random copolymer (B) being a graft-modified product of an ethylene/1-butene random copolymer having (a) a 1-butene content of 15 to 25% by mol, (b) an intrinsic viscosity [$\eta$], as measured in decalin at 135° C., of 0.5 to 3.5 dl/g, (c) a glass transition temperature (Tg) of not higher than −60° C., (d) a crystallinity, as measured by X-ray diffractometry, of less than 10%, and (e) a parameter (B value) indicating randomness of a copolymerized monomer chain distribution, as measured by a $^{13}$C-NMR method, of 1.0 to 1.4.

BEST MODE FOR CARRYING OUT THE INVENTION

The polyamide resin composition according to the invention will be described in detail hereinafter.

The polyamide resin composition of the invention comprises a polyamide resin (A) and a specific graft-modified ethylene/1-butene random copolymer (B) in specific amounts.

Polyamide Resin (A)

There is no specific limitation on the polyamide resin (A) used for the invention, and the polyamide resin (A) means a polymer derived from amino acid lactams or a polymer derived from diamine and a carboxylic acid. These polymers are formed by melt polymerization and are melt moldable.

Examples of the polyamide resin (A) used for the invention include the following resins:

(1) polycondensates of organic dicarboxylic acids of 4 to 12 carbon atoms and organic diamines of 2 to 13 carbon atoms, such as polyhexamethylene adipamide [6,6 nylon], i.e., a polycondensate of hexamethylenediamine and an adipic acid, polyhexamethylene azelamide [6,9 nylon], i.e., a polycondensate of hexamethylenediamine and an azelaic acid, polyhexamethylene sebacamide [6,10 nylon], i.e., a polycondensate of hexamethylenediamine and a sebacic acid, polyhexamethylene dodecanoamide [6,12 nylon], i.e., a polycondensate of hexamethylenediamine and a dodecanedioic acid, and polybis(4-aminocyclohexyl)

methanedodecane, i.e., a polycondensate of bis-p-aminocyclohexylmethane and a dodecanedioic acid;

(2) polycondensates of ω-amino acids, such as polyundecanamide [11 nylon], i.e., a polycondensate of an ω-aminoundecanoic acid; and (3) ring-opening polymers of lactam, such as polycapramide [6 nylon], i.e., a ring-opening polymer of ε-aminocaprolactam, and polylauric lactam [12 nylon], i.e., a ring-opening polymer of ε-aminolaurolactam.

Of these, preferably used are polyhexamethylene adipamide (6,6 nylon), polyhexamethylene azelamide (6,9 nylon) and polycapramide (6 nylon).

Also employable in the invention are polyamide resins prepared from, for example, an adipic acid, an isophthalic acid and hexamethylenediamine, and blends of two or more kinds of polyamide resins such as a mixture of 6 nylon and 6,6 nylon.

The above-mentioned polyamide resins (1) can be prepared by polycondensing organic dicarboxylic acids of 4 to 12 carbon atoms and organic diamines of 2 to 13 carbon atoms in equimolar amounts. If necessary, the organic dicarboxylic acid may be used in a larger amount than the organic diamine so that the carboxyl group is in excess of the amino group in the polyamide resin, or to the contrary, the organic dicarboxylic acid may be used in a smaller amount than the organic diamine so that the amino group is in excess of the carboxyl group.

Examples of the organic dicarboxylic acids include adipic acid, pimelic acid, suberic acid, sebacic acid and dodecanedioic acid.

Examples of the organic diamines include hexamethylenediamine and octamethylenediamine.

The polyamide resins (1) can be also prepared from derivatives capable of producing carboxylic acids, e.g., esters and acid chlorides, and derivatives capable of producing amines, e.g., amine salts.

The polyamide resins (2) can be prepared by, for example, polycondensing an ω-amino acid under heating in the presence of a small amount of water. In this case, a viscosity stabilizer such as an acetic acid is often added in a small amount.

The polyamide resins (3) can be prepared by, for example, ring-opening polymerizing lactam under heating in the presence of a small amount of water. In this case, a viscosity stabilizer such as an acetic acid is often added in a small amount.

Graft-modified Ethylene/1-Butene Random Copolymer (B)

The graft-modified ethylene/1-butene random copolymer (B) used for the invention is obtained by grafting a specific ethylene/1-butene random copolymer (also referred to as "unmodified ethylene/1-butene random copolymer" hereinafter) with a specific amount of an unsaturated carboxylic acid or its derivative.

The unmodified ethylene/1-butene random copolymer has a 1-butene content of 15 to 25% by mol, preferably 18 to 22% by mol. If the unmodified ethylene/1-butene random copolymer having a 1-butene content of the above range, a graft-modified ethylene/1-butene random copolymer (B) showing high flexibility and good handling properties can be obtained. Further, if this graft-modified ethylene/1-butene random copolymer (B) is used, a polyamide resin composition capable of providing a molded article excellent in low-temperature impact resistance and flexibility can be obtained.

The unmodified ethylene/1-butene random copolymer has an intrinsic viscosity [η], as measured in decalin at 135° C., of 0.5 to 3.5 dl/g, preferably 1.5 to 3.0 dl/g. The graft-modified ethylene/1-butene random copolymer (B) obtained from the unmodified ethylene/1-butene random copolymer (B) having an intrinsic viscosity of the above range shows good blending properties with the polyamide resin (A). Further, if this graft-modified ethylene/1-butene random copolymer (B) is used, a polyamide resin composition excellent in moldability can be obtained.

The unmodified ethylene/1-butene random copolymer has a glass transition point (Tg), as measured by DSC (differential scanning calorimeter), of not higher than −60° C. If the graft-modified ethylene/1-butene random copolymer (B) obtained from the unmodified ethylene/1-butene random copolymer having a glass transition point (Tg) of not higher than −60° C., a polyamide resin composition capable of providing a molded article excellent in low-temperature impact resistance and low-temperature flexibility can be obtained. The unmodified ethylene/1-butene random copolymer has a melting point of not higher than 60° C.

The unmodified ethylene/1-butene random copolymer has a crystallinity, as measured by X-ray diffractometry, of less than 10%, preferably not more than 5%. If the graft-modified ethylene/1-butene random copolymer (B) obtained from the unmodified ethylene/1-butene random copolymer having a crystallinity of less than 10%, a polyamide resin composition excellent in moldability can be obtained.

The unmodified ethylene/1-butene random copolymer has a parameter (B value) indicating randomness of a copolymeried monomer chain distribution, as measured by a $^{13}$C-NMR method, of 1.0 to 1.4.

The B value is an index of a composition distribution of the constituent units derived from each monomers in the copolymer chains, and can be calculated by the following equation:

$$B = P_{BE}/(2P_B \cdot P_E)$$

wherein $P_E$ and $P_B$ are a molar fraction of the ethylene component and a molar fraction of the 1-butene component, respectively, contained in the unmodified ethylene/1-butene random copolymer; and $P_{BE}$ is a proportion of the number of the ethylene/1-butene alternating chains to the number of the whole diad chains.

The values for $P_E$, $P_B$ and $P_{BE}$ can be determined in concrete in the following manner.

In a test tube having a diameter of 10 mm, about 200 mg of an unmodified ethylene/1-butene random copolymer is homogeneously dissolved in 1 ml of hexachlorobutadiene to prepare a sample, and a $^{13}$C-NMR spectrum of the sample is measured under the following measuring conditions.

Measuring Conditions

Measuring temperature: 120° C.

Measuring frequency: 20.05 MHz

Spectrum width: 1,500 Hz

Filter width: 1,500 Hz

Pulse repetition time: 4.2 sec

Pulse width: 7 μsec

Integration times: 2,000–5,000 times

The $P_E$, $P_B$ and $P_{BE}$ values can be determined from the $^{13}$C-NMR spectrum measured above in accordance with the reports by G. J. Ray (Macromolecules, 10,773 (1977)), and J. C. Randall (Macromolecules, 15,353 (1982)) and K. Kimura (Polymer, 25, 4418 1984)).

The B value determined by the above formula becomes 2 when the both monomer units of the unmodified ethylene/1-butene copolymer are alternately distributed; and the B value becomes 0 in the case of a perfect block copolymer, that is, when the both monomers are polymerized in the perfectly separated state.

If the graft-modified ethylene/1-butene random copolymer (B) obtained from the unmodified ethylene/1-butene random copolymer having a B value of the above range, a polyamide resin composition capable of providing a molded article excellent in low-temperature impact resistance can be obtained.

The unmodified ethylene/1-butene random copolymer having the above-mentioned properties can be prepared by copolymerizing ethylene and 1-butene at random in the presence of a vanadium catalyst formed from a soluble vanadium compound and an alkylaluminum halide compound or a zirconium catalyst formed from a metallocene compound of zirconium and an organoaluminum oxy-compound.

Examples of the soluble vanadium compound used for the vanadium catalyst include vanadium tetrachloride, vanadium oxytrichloride, vanadium monoethoxydichloride, vanadium triacetylacetonate and oxyvanadium triacetylacetonate.

Examples of the alkylaluminum halide compound used for the vanadium catalyst include ethylaluminum dichloride, diethylaluminum monochloride, ethylaluminum sesquichloride, diethylaluminum monobromide, diisobutylaluminum monochloride, isobutylaluminum dichloride and isobutylaluminum sesquichloride.

Examples of the metallocene compound of zirconium used for the zirconium catalyst include ethylenebis(indenyl)zirconium dibromide, dimethylsilylenebis(2-methylindenyl)zirconium dichloride, bis(cyclopentadienyl)zirconium dibromide and bis(dimethylcyclopentadienyl)zirconium dichloride.

Examples of the organoaluminum oxy-compound used for the zirconium catalyst include aluminoxane and a benzene-insoluble organoaluminum oxy-compound.

The zirconium catalyst may contain an organoaluminium compound in addition to the metallocene compound of zirconium and the organoaluminum oxy-compound.

Examples of the organoaluminum compound include triisobutylaluminum, dimethylaluminum chloride and methylaluminum sesquichloride.

The polymerization can be carried out either in the solution state, in the suspension state or in their intermediate state, but in any case, an inert solvent is preferably used as a reaction medium.

As described above, the graft-modified ethylene/1-butene random copolymer (B) is obtained by graft-modifying the unmodified ethylene/1-butene random copolymer with a specific amount of an unsaturated carboxylic acid or its derivative.

The graft quantity of the unsaturated carboxylic acid or its derivative in the graft-modified ethylene/1-butene random copolymer (B) is in the range of 0.01 to 10% by weight, preferably 0.1 to 5% by weight, based on 100% by weight of the unmodified ethylene/1-butene random copolymer.

The graft-modified ethylene/1-butene random copolymer (B) having a graft quantity of the above range is excellent in dispersibility in the polyamide resin composition and heat stability, and is free from coloring of the resin in the melting procedure. Moreover, if this graft-modified ethylene/1-butene random copolymer (B) is used, a polyamide resin composition capable of providing a molded article excellent in mechanical strength can be obtained.

Examples of the unsaturated carboxylic acids used herein include acrylic acid, maleic acid, fumaric acid, tetrahydrophthalic acid, itaconic acid, citraconic acid, crotonic acid, isocrotonic acid and nadic acid™ (endocisbicyclo[2,2,1]hepto-5-ene-2,3-dicarboxylic acid).

Examples of the derivatives of the unsaturated carboxylic acids include acid halide compounds, amide compounds, imide compounds, acid anhydrides and ester compounds, of the above-mentioned unsaturated carboxylic acids. More specifically, there can be mentioned malenyl chloride, maleimide, maleic anhydride, citraconic anhydride, monomethyl maleate, dimethyl maleate and glycidyl maleate. Of these, preferred are unsaturated dicarboxylic acids and acid anhydrides thereof. Particularly preferred are maleic acid, nadic acid™ and acid anhydrides thereof.

There is no specific limitation on the graft position of the unsaturated carboxylic acid or its derivative grafted on the unmodified ethylene/1-butene random copolymer, and it is sufficient that the unsaturated carboxylic acid or its derivative is bonded to an arbitrary carbon atom of an ethylene/1-butene random copolymer which constitutes the graft-modified ethylene/1-butene random copolymer (B)

The graft-modified ethylene/1-butene random copolymer (B) can be prepared by various processes conventionally known, such as:

(1) a process comprising melting the unmodified ethylene/1-butene random copolymer and adding the unsaturated carboxylic acid or the like to the molten copolymer to perform graft copolymerization, and (2) a process comprising dissolving the unmodified ethylene/1-butene random copolymer in a solvent and adding the unsaturated carboxylic acid or the like to the resulting solution to perform graft copolymerization.

In any of the above processes, the graft reaction is preferably carried out in the presence of a radical initiator in order to efficiently graft-copolymerize the graft monomer such as the unsaturated carboxylic acid.

As the radical initiator, for example, an organic peroxide or an azo compound is employed.

Particular examples of the radical initiators include:

organic peroxides, such as benzoyl peroxide, dichlorobenzoyl peroxide, dicumyl peroxide, di-tert-butyl peroxide, 2,5-dimethyl-2,5-di(peroxy benzoate)hexyne-3, 1,4-bis(tert-butylperoxyisopropyl)benzene, lauroyl peroxide, tert-butyl peracetate, 2,5-dimethyl-2,5-di(tert-butyl peroxy)hexyne-3, 2,5-dimethyl-2,5-di(tert-butyl peroxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate; and azo compounds, such as azobisisobutyronitrile and dimethyl azoisobutyrate.

Of these, preferably used are dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane and 1,4-bis(tert-butylperoxyisopropyl)benzene.

The radical initiator is used in an amount of usually 0.001 to 1 part by weight, preferably 0.005 to 0.5 part by weight, more preferably 0.01 to 0.3 part by weight, based on 100 parts by weight of the unmodified ethylene/1-butene random copolymer.

The reaction temperature of the graft reaction using or not using the radical initiator is in the range of usually 60° to 350° C., preferably 150° to 300° C.

The graft-modified ethylene/1-butene random copolymer (B) is used in an amount of 5 to 200 parts by weight, preferably 10 to 100 parts by weight, more preferably 10 to 60 parts by weight, based on 100 parts by weight of the polyamide resin (A). If the graft-modified ethylene/1-butene random copolymer is used in such an amount as mentioned above, a polyamide resin composition showing good moldability and capable of providing a molded article excellent in flexibility, low-temperature impact resistance, resistance to water absorption and resistance to saline solutions can be obtained.

Other Additives

Other than the polyamide resin (A) and the graft-modified ethylene/1-butene random copolymer (B), various additives such as antioxidant, ultraviolet absorbent, light protective agent, phosphite type heat stabilizer, peroxide decomposer, basic co-stabilizer, nucleating agent, plasticizer, lubricant, antistatic agent, flame retardant, pigment, dye and filler may be added if necessary to the polyamide resin composition of the invention, with the proviso that the object of the invention is not marred. Further, to the polyamide resin composition of the invention may be also added other polymers, with the proviso that the object of the invention is not marred.

Examples of the fillers include carbon black, asbestos, talc, silica and silica alumina.

Preparation of the Polyamide Resin Composition

The polyamide resin composition according to the invention is prepared by melt mixing the polyamide resin (A), the graft-modified ethylene/1-butene random copolymer (B) and if necessary other additives, by various methods conventionally known. That is, the polyamide resin composition of the invention can be obtained by introducing the above components simultaneously or one after another into, for example, a Henschel mixer, a V-shaped blender, a tumbling mixer or a ribbon blender, then mixing them, and melt kneading the resulting mixture by means of a single-screw extruder, a multi-screw extruder, a kneader, a Banbury mixer or the like.

If an apparatus of high kneading performance such as a multi-screw extruder, a kneader or a Banbury mixer among the above apparatuses is used, a polyamide resin composition of high quality in which each component is uniformly dispersed can be obtained.

The aforesaid additives such as antioxidant may be added if necessary in any of the above stages.

The polyamide resin composition of the invention obtained as above can be molded into various shapes by means of known melt molding methods such as injection molding, extrusion molding, compression molding and foam molding.

EFFECT OF THE INVENTION

The polyamide resin composition according to the invention comprises the polyamide resin (A) and the graft-modified ethylene/1-butene random copolymer (B) having a graft quantity of the unsaturated carboxylic acid or its derivative of 0.01 to 10% by weight, in a specific proportion therebetween. Moreover, the graft-modified ethylene/1-butene random copolymer (B) is a graft-modified product of an ethylene/1-butene random copolymer having a 1-butene content, an intrinsic viscosity, a glass transition temperature, a crystallinity and a B value, all in the specific ranges. Hence, the polyamide resin composition shows high melt flowability, that is, good moldability, and is capable of providing a molded article excellent in flexibility, low-temperature impact resistance, resistance to water absorption and resistance to saline solutions.

The present invention is further described with reference to the following examples, but it should be construed that the invention is in no way limited to those examples.

EXAMPLE 1

[Preparation of an Ethylene/1-Butene Random Copolymer]

In a polymerizer, a mixed gas of ethylene and 1-butene and a hydrogen gas were added to hexane (polymerization solvent) to continuously polymerize ethylene and 1-butene under the conditions of 40° C., 5 kg/cm$^2$ and a residence time of 1 hour using vanadium oxytrichloride and ethylaluminum sesquichloride as polymerization catalysts. Then, the solvent was removed from the resulting reaction solution to obtain the aimed ethylene/1-butene random copolymer.

The copolymer thus obtained had a 1-butene content of 19% by mol, an intrinsic viscosity [η], as measured in decalin at 135° C., of 2.2 dl/g, a glass transition temperature of −65° C., a crystallinity, as measured by X-ray diffractometry, of 2%, and a parameter (B value) indicating randomness of a copolymerized monomer chain distribution, as measured by a $^{13}$C-NMR method, of 1.1.

[Preparation of a Maleic Anhydride Graft-Modified Ethylene/1-Butene Random Copolymer]

In a Henschel mixer, 10 kg of the ethylene/1-butene random copolymer was blended with a solution obtained by dissolving 50 g of maleic anhydride and 3 g of di-tert-butyl peroxide in 50 g of acetone.

Then, the blend obtained above was introduced into a single-screw extruder having a screw diameter of 40 mm and L/D of 26 through the extruder hopper, and extruded into strands at a resin temperature of 260° C. and an extruder output of 6 kg/hr. The strands were cooled and pelletized to obtain a maleic anhydride graft-modified ethylene/1-butene random copolymer.

After the unreacted maleic anhydride was extracted with acetone from the graft-modified ethylene/1-butene random copolymer, a graft quantity of the maleic anhydride in the graft-modified ethylene/1-butene random copolymer was measured. As a result, the graft quantity was 0.43% by weight.

[Preparation of a Polyamide Resin Composition]

In a Henschel mixer, 100 parts by weight of 6 nylon [Amiran CM1017, available from Toray Industries, Inc., MFR (235° C., load of 2.16 kg): 33 g/10 min] was blended with 25 parts by weight of the maleic anhydride graft-modified ethylene/1-butene random copolymer pellets to prepare a dry blend.

Then, the dry blend was fed to a twin-screw extruder (L/D: 40, diameter: 30 mm) preset at 245° C. to prepare pellets of a polyamide resin composition.

The pellets of the polyamide resin composition thus obtained were dried at 80° C. overnight, and subjected to injection molding under the following conditions to prepare a specimen for property test. In order to examine a spiral flow of the composition, the pellets were injected under the following conditions using a mold having a diameter of 3.8 mm and provided with semispherical spiral grooves, and the flow distance was measured.

Injection Molding Conditions

Cylinder temperature: 245° C.

Injection pressure: 1,000 kg/cm$^2$

Mold temperature: 80° C.

Subsequently, the polyamide resin composition was evaluated on various properties by the following test methods.

(1) Flexural test

The flexural modulus (FM, kg/cm$^2$) was measured using a specimen having a thickness of ⅛" in accordance with ASTM D 790. Conditioning of the specimen was carried out in a dry state at 23° C. for 2 days.

(2) Izod impact test

The notched Izod impact strength was measured at −40° C. using a specimen having a thickness of ⅛" in accordance with ASTM D 256. Conditioning of the specimen was carried out in a dry state at 23° C. for 2 days.

(3) Water absorption test

The water absorption test was carried out in the manner described below. A specimen having a diameter of 2 inches and a thickness of ⅛" was dried at 100° C. for 24 hours and then allowed to absorb water in warm water at 50° C. for 48 hours. From the change in weight of the specimen before and after the test, the water absorption was determined.

The results are set forth in Table 1.

EXAMPLES 2 & 3

A polyamide resin composition was prepared in the same manner as described in Example 1 except that the amount of the maleic anhydride graft-modified ethylene/1-butene random copolymer was varied to 40 parts by weight and to 100 parts by weight. The polyamide resin composition was measured on the spiral flow, the flexural modulus, the notched Izod impact strength at −40° C. and the water absorption.

The results are set forth in Table 1.

EXAMPLE 4

A maleic anhydride graft-modified ethylene/1-butene random copolymer was obtained in the same manner as described in Example 1 except that the maleic anhydride was used in an amount of 100 g. A graft quantity of the maleic anhydride in the maleic anhydride graft-modified ethylene/1-butene random copolymer was 0.91% by weight. Then, a polyamide resin composition was prepared in the same manner as described in Example 1 except that this graft-modified ethylene/1-butene random copolymer was used. The polyamide resin composition was measured on the spiral flow, the flexural modulus, the notched Izod impact strength at −40° C. and the water absorption.

The results are set forth in Table 1.

EXAMPLE 5

A polyamide resin composition was prepared in the same manner as described in Example 4 except that the amount of the maleic anhydride graft-modified ethylene/1-butene random copolymer of example 4 was varied to 40 parts by weight. The polyamide resin composition was measured on the spiral flow, the flexural modulus, the notched Izod impact strength at −40° C. and the water absorption.

The results are set forth in Table 1.

EXAMPLE 6

A polyamide resin composition was prepared in the same manner as described in Example 4 except that 6,6 nylon [Amiran CM3001N, available from Toray industries, Inc., MFR (280° C., load of 2.16 kg): 5 g/10 min] was used in place of the 6 nylon and the preset temperature of the twin-screw extruder was varied to 280° C. in the preparation of a polyamide resin composition from the 6,6 nylon and the maleic anhydride graft-modified ethylene/1-butene random copolymer of Example 4. The polyamide resin composition was measured on the spiral flow, the flexural modulus, the notched Izod impact strength at −40 ° C. and the water absorption.

The results are set forth in Table 1.

EXAMPLES 7 & 8

A polyamide resin composition was prepared in the same manner as described in Example 6 except that the amount of the maleic anhydride graft-modified ethylene/1-butene random copolymer was varied to 40 parts by weight and to 100 parts by weight. The polyamide resin composition was measured on the spiral flow, the flexural modulus, the notched Izod impact strength at −40° C. and the water absorption.

The results are set forth in Table 1.

COMPARATIVE EXAMPLE 1

The 6 nylon used in Example 1 was measured on the spiral flow, the flexural modulus, the notched Izod impact strength at −40° C. and the water absorption by the same test methods as described in Example 1.

The results are set forth in Table 2.

COMPARATIVE EXAMPLE 2

A polyamide resin composition was prepared in the same manner as described in Example 1 except that the unmodified ethylene/1-butene random copolymer of Example 1 was used in place of the maleic anhydride graft-modified ethylene/1-butene random copolymer. The polyamide resin composition was measured on the spiral flow, the flexural modulus, the notched Izod impact strength at −40° C. and the water absorption.

The results are set forth in Table 2.

COMPARATIVE EXAMPLE 3

A maleic anhydride graft-modified ethylene/1-butene random copolymer was obtained in the same manner as described in Example 1 except that an ethylene/1-butene random copolymer having a 1-butene content of 10% by mol, an intrinsic viscosity [η], as measured in decalin at 135° C., of 2.1 dl/g, a glass transition temperature of −50° C., a crystallinity, as measured by X-ray diffractometry, of 15%, and a parameter (B value) indicating randomness of a copolymerized monomer chain distribution, as measured by a $^{13}$C-NMR method, of 1.1 was used in place of the unmodified ethylene/1-butene random copolymer of Example 1. A graft quantity of the maleic anhydride in this maleic anhydride graft-modified ethylene/1-butene random copolymer was 0.43% by weight. Then, a polyamide resin composition was prepared in the same manner as described in Example 1 except that this graft-modified ethylene/1-butene random copolymer was used. The polyamide resin composition was measured on the spiral flow, the flexural modulus, the notched Izod impact strength at −40° C. and the water absorption.

The results are set forth in Table 2.

COMPARATIVE EXAMPLE 4

A maleic anhydride graft-modified ethylene/1-butene random copolymer was obtained in the same manner as described in Example 1 except that an ethylene/1-butene random copolymer having a 1-butene content of 35% by mol, an intrinsic viscosity [η], as measured in decalin at 135° C., of 2.0 dl/g, a glass transition temperature of −70° C., a crystallinity, as measured by X-ray diffractometry, of 0%, and a parameter (B value) indicating randomness of a copolymerized monomer chain distribution, as measured by a $^{13}$C-NMR method, of 1.4 was used in place of the unmodified ethylene/1-butene random copolymer of Example 1. A graft quantity of the maleic anhydride in this maleic anhydride graft-modified ethylene/1-butene random copolymer was 0.38% by weight. Then, a polyamide resin composition was prepared in the same manner as described in Example 1 except that this graft-modified ethylene/1-butene random copolymer was used. The polyamide resin composition was measured on the spiral flow, the flexural modulus, the notched Izod impact strength at −40° C. and the water absorption.

The results are set forth in Table 2.

The maleic anhydride graft-modified ethylene/1-butene random copolymer obtained above was unable to be kept in the form of pellets, and handling of the copolymer was difficult.

TABLE 1

|  | Unit | Ex. 1 | Ex. 2 | Ex. 3 | Ex. 4 |
| --- | --- | --- | --- | --- | --- |
| Unmodified copolymer |  |  |  |  |  |
| Content of 1-butene | mol % | 19 | 19 | 19 | 19 |
| Intrinsic viscosity [η] | dl/g | 2.2 | 2.2 | 2.2 | 2.2 |
| Glass transition temp. | °C. | −65 | −65 | −65 | −65 |
| Crystallinity | % | 2 | 2 | 2 | 2 |
| B value | — | 1.1 | 1.1 | 1.1 | 1.1 |
| Modified product |  |  |  |  |  |
| Amount of MAH (per 100 wt % of unmodified copolymer) | wt. % | 0.5 | 0.5 | 0.5 | 1.0 |
| Graft quantity of MAH | wt. % | 0.43 | 0.43 | 0.43 | 0.91 |
| Components |  |  |  |  |  |
| 6 Nylon | wt. part | 100 | 100 | 100 | 100 |
| 6,6 Nylon | wt. part | — | — | — | — |
| Modified product | wt. part | 25 | 40 | 100 | 25 |
| Properties of composition |  |  |  |  |  |
| FM | kg/cm$^2$ | 18600 | 14500 | 4500 | 18300 |
| Izod impact strength (notched, −40° C.) | kg · cm/cm | 17 | N.B. | N.B. | 19 |
| Spiral flow | cm | 43 | 35 | 25 | 37 |
| Water absorption | % | 3.8 | 3.0 | 1.8 | 3.9 |

|  | Unit | Ex. 5 | Ex. 6 | Ex. 7 | Ex. 8 |
| --- | --- | --- | --- | --- | --- |
| Unmodified copolymer |  |  |  |  |  |
| Content of 1-butene | mol % | 19 | 19 | 19 | 19 |
| Intrinsic viscosity [η] | dl/g | 2.2 | 2.2 | 2.2 | 2.2 |
| Glass transition temp. | °C. | −65 | −65 | −65 | −65 |
| Crystallinity | % | 2 | 2 | 2 | 2 |
| B value | — | 1.1 | 1.1 | 1.1 | 1.1 |

TABLE 1-continued

| Modified product |  |  |  |  |  |
| --- | --- | --- | --- | --- | --- |
| Amount of MAH (per 100 wt % of unmodified copolymer) | wt. % | 1.0 | 1.0 | 1.0 | 1.0 |
| Graft quantity of MAH | wt. % | 0.91 | 0.91 | 0.91 | 0.91 |
| Components |  |  |  |  |  |
| 6 Nylon | wt. part | 100 | — | — | — |
| 6,6 Nylon | wt. part | — | 100 | 100 | 100 |
| Modified product | wt. part | 40 | 25 | 40 | 100 |
| Properties of composition |  |  |  |  |  |
| FM | kg/cm$^2$ | 14300 | 19500 | 15100 | 5100 |
| Izod impact strength (notched, −40° C.) | kg · cm/cm | N.B. | 25 | N.B. | N.B. |
| Spiral flow | cm | 30 | 36 | 30 | 22 |
| Water absorption | % | 3.1 | 3.4 | 2.7 | 1.5 |

(Note)
MAH: maleic anhydride

TABLE 2

|  | Unit | Comp. Ex. 1 | Comp. Ex. 2 | Comp. Ex. 3 | Comp. Ex. 4 |
| --- | --- | --- | --- | --- | --- |
| Unmodified copolymer |  |  |  |  |  |
| Content of 1-butene | mol % | — | 19 | 10 | 35 |
| Intrinsic viscosity [η] | dl/g | — | 2.2 | 2.1 | 2.0 |
| Glass transition temp. | °C. | — | −65 | −50 | −70 |
| Crystallinity | % | — | 2 | 15 | 0 |
| B value | — | 1.1 | 1.1 | 1.1 |  |
| Modified product |  |  |  |  |  |
| Amount of MAH (per 100 wt % of unmodified copolymer) | wt. % | — | 0 | 0.5 | 0.5 |
| Graft quantity of MAH | wt. % | — | — | 0.43 | 0.38 |
| Components |  |  |  |  |  |
| 6 Nylon | wt. part | 100 | 100 | 100 | 100 |
| 6,6 Nylon | wt. part | — | — | — | — |
| Modified product | wt. part | 0 | 0 | 25 | 25 |
| Unmodified product | wt. part | — | 25 | — | — |
| Properties of composition |  |  |  |  |  |
| FM | kg/cm$^2$ | 26500 | 18600 | 14500 | 12000 |
| Izod impact strength (notched, −40° C.) | kg · cm/cm | 3 | 4 | 10 | 20 |
| Spiral flow | cm | 57 | 41 | 42 | 33 |
| Water absorption | % | 8.4 | 3.8 | 3.7 | 3.6 |

(Note)
MAH: maleic anhydride

We claim:

1. A polyamide resin composition comprising:

(A) a polyamide resin in an amount of 100 parts by weight, and (B) a graft-modified ethylene/1-butene random copolymer having a graft quantity of an unsaturated carboxylic acid or its derivative of 0.01 to 10% by weight, in an amount of 5 to 200 parts by weight, wherein the graft-modified ethylene/1-butene random copolymer (B) is a graft-modified product of an ethylene/1-butene random copolymer having (a) a 1-butene content of 15 to 25% by mol, (b) an intrinsic viscosity [η], as measured in decalin at 135° C., of 0.5 to 3.5 dl/g, (c) a glass transition temperature (Tg) of not higher than −60° C., (d) a crystallinity, as measured by X-ray diffractometry, of less than 10%, and (e) a parameter (B value) indicating randomness of a copolymerized monomer chain distribution, as measured by a $^{13}$C-NMR method, of 1.0 to 1.4.

2. The polyamide resin composition according to claim 1 wherein said graft-modified ethylene/1-butene random copolymer (b) has a crystallinity (d), as measured by X-ray diffractometry, higher than 0% and not more than 5%.

3. The polyamide resin composition of claim 2 wherein the graft-modified ethylene/1-butene random copolymer (B) has (a) a 1-butene content of 18 to 22% by mol, and (b) an intrinsic viscosity (η), as measured in decalin at 135° C., of from 1.5 to 3.0 dl/g.

4. The polyamide resin composition of claim 1 wherein the graft-modified ethylene/1-butene random copolymer has a graft quantity of the unsaturated carboxylic acid or its derivative of 0.1 to 5% by weight, and is present in the composition in an amount of 10 to 100 parts by weight.

5. The polyamide resin composition of claim 4 wherein the amount of the graft-modified ethylene/1-butene random copolymer is 10 to 60 parts by weight.

6. The polyamide resin composition according to claim 5 wherein the graft-modified ethylene/1-butene random copolymer (B) has (a) a 1-butene content of about 19% by mol, (b) an intrinsic viscosity (η), as measured in decalin at 135° C., of about 2.2, (c) a glass transition temperature (Tg) of about −65° C., (d) a crystallinity, as measured by X-ray diffractometry, of about 2%, and (e) a B value of about 1.1.

7. A moldable polyamide resin composition capable of providing flexible molded article having improved low-temperature impact resistance, and which has resistance to water-absorption and resistance to saline solutions, said composition comprising a mixture, obtained by melt-mixing, (A) a polyamide resin in an amount of 100 parts by weight, and (B) a graft-modified ethylene/1-butene random copolymer having a graft quantity of an unsaturated carboxylic acid or its derivative of 0.1 to 5% by weight, in an amount of 10 to 100 parts by weight, wherein the graft-modified ethylene/1-butene random copolymer (B) is a graft-modified product of an ethylene/1-butene random copolymer having (a) a 1-butene content of 18 to 22% by mol, (b) an intrinsic viscosity (η), as measured in decalin at 135° C., of 1.5 to 3.0 dl/g, (c) a glass transition temperature (Tg) of not higher than −60° C., (d) a crystallinity, as measured by X-ray diffractometry, of less than 5%, and (e) a parameter (B value) indicating randomness of a copolymerized monomer chain distribution, as measured by a $^{13}$C-NMR method, of 1.0 to 1.4.

8. A molded article obtained by melt molding the composition of claim 1.

9. A molded article obtained by melt molding the composition of claim 7.

10. The molded article of claim 9 having a notched Izod impact strength at −40° C. of at least about 17 kg·cm/cm.

* * * * *